United States Patent [19]

Miyakawa

[11] Patent Number: 5,327,063
[45] Date of Patent: Jul. 5, 1994

[54] METHOD OF CONTROLLING A STEPPING MOTOR

[75] Inventor: Akira Miyakawa, Yokohama, Japan

[73] Assignee: Canon Kabushiki Kaisha, Tokyo, Japan

[21] Appl. No.: 935,419

[22] Filed: Aug. 26, 1992

[30] Foreign Application Priority Data

Aug. 30, 1991 [JP] Japan .................. 3-219831

[51] Int. Cl.$^5$ .............................................. H02P 8/00
[52] U.S. Cl. .................................... 318/696; 318/757; 318/369
[58] Field of Search ................... 318/590–596, 318/129, 257, 362–369, 685, 696

[56] References Cited

U.S. PATENT DOCUMENTS

| | | | |
|---|---|---|---|
| 3,953,774 | 4/1976 | Sato et al. | 318/594 |
| 4,062,004 | 12/1977 | Roantree et al. | 340/187 |
| 4,118,774 | 10/1978 | Franke | 364/431 |
| 4,349,770 | 9/1982 | Ragen | 318/685 |
| 4,574,227 | 3/1986 | Herder et al. | 318/594 |
| 4,577,141 | 3/1986 | Saiki et al. | 318/590 |
| 4,594,536 | 6/1986 | Tamagaki | 318/561 |
| 4,924,185 | 5/1990 | Kohno | 318/592 |

*Primary Examiner*—William M. Shoop, Jr.
*Assistant Examiner*—Brian Sircus
*Attorney, Agent, or Firm*—Fitzpatrick, Cella, Harper & Scinto

[57] ABSTRACT

The operation of this invention is such that a rotational quantity of a motor is determined in accordance with a rotation indicating command of a motor, rotation actuating control of the motor is changed according to the determined rotational quantity of the motor, and a magnetization maintaining time of a magnetization phase of the motor is varied based on the rotation actuating control of the motor.

3 Claims, 3 Drawing Sheets

STOPPED AFTER MOTOR IS ACTUATED ONLY IN THE SELF-STARTING RANGE

STOPPED AFTER THROUGH AREA

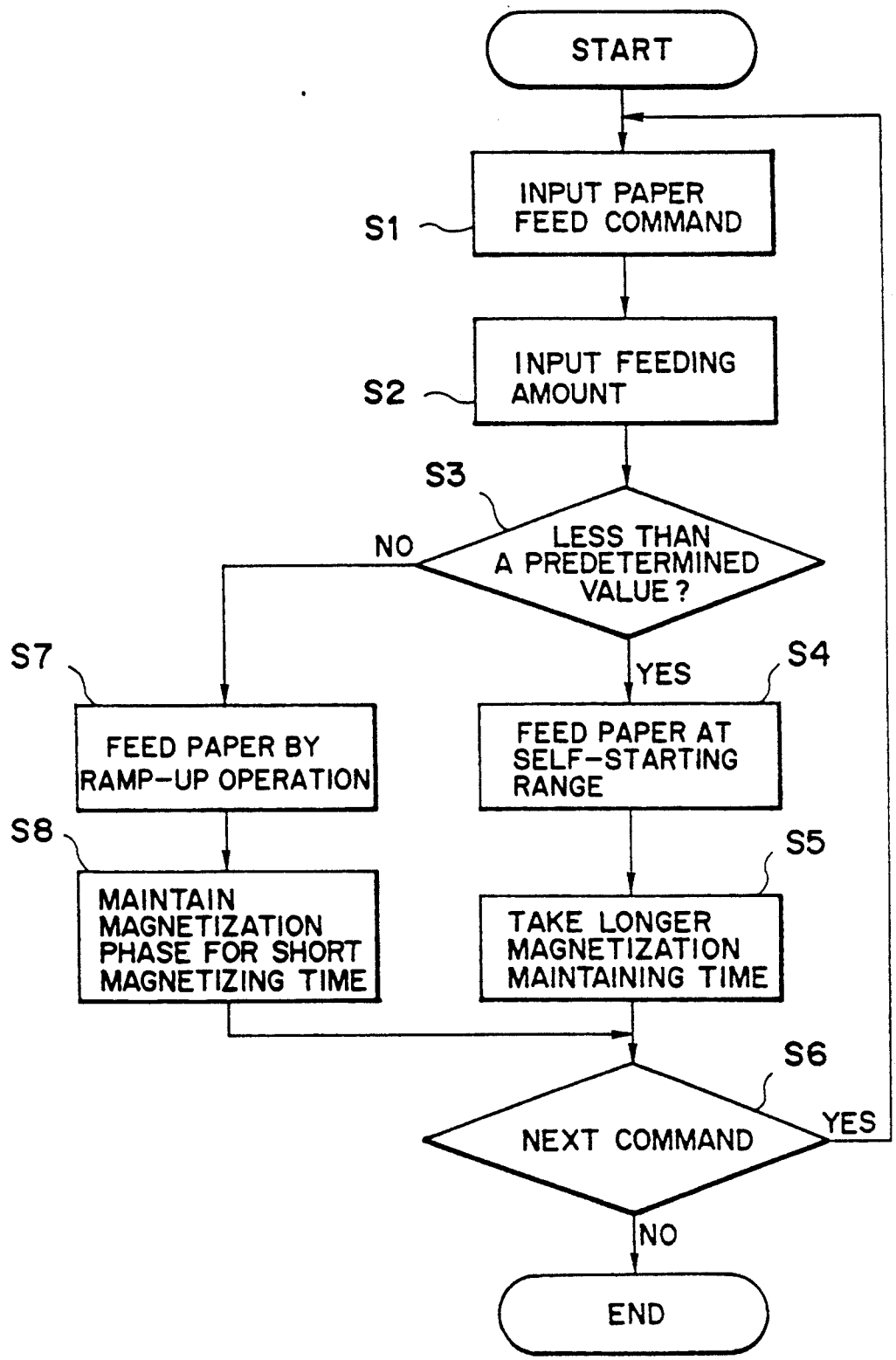

METHOD OF CONTROLLING A STEPPING MOTOR

BACKGROUND OF THE INVENTION

1. Field of the Invention

The present invention relates to a motor control system for controlling a rotation of a stepping motor such as, e.g., a paper feed motor or the like in a printer.

2. Related Background Art

In general, a paper feed motor in a printer, etc. has hitherto involved the use of a stepping motor. In this type of printer, a high carrier accuracy of the recording paper has been required because of the attaining of a more sophisticated color reproducibility in color printing as well as of the fact that a high-accuracy and high-density printing operation could be obtained with an advancement of the printing technology.

For enhancing such a paper feed accuracy, the ratio of transmission from a paper feed motor to a carrier mechanism is reduced, and the paper feed quantity is controlled by employing a feedback technique, etc, thereby attaining sufficient accuracy. If the deceleration ratio is thus increased, however, the paper feed velocity decreases for the rotation of the motor. A large-sized motor has to be adopted to compensate for this decrease. As a result, there arise problems that the printer system increases both in size and in costs, and consumed the electric power increases.

Besides, during actuation of the stepping motor, if actuation does not occur from a self-starting range, the stepping motor can not be started up. Hence, the stepping motor is normally driven by effecting a ramp-up (acceleration control) from a low self-starting range. Typically, in the printer which uses a small-sized stepping motor, the least paper feed quantity required is matched with the minimum step angle of the stepping motor, thereby defining a deceleration ratio. The paper is fed in a through-area in combination with the ramp-up described above. At the same time, noises caused by the motor are reduced, and the paper feed control adapted to control the paper feed velocity is executed with a small amount of electric power consumed.

Generally, however, all the paper feed operations can not be necessarily controlled by the ramp-up operation. For instance, in a paper feed operation controlled by 3-step ramp-ups, in which paper feeding is less than three times the minimum step angle of the stepping motor, the paper feed comes to an end during these ramp-ups. As described herein, in the case of the small paper feed quantity, the paper has to be fed by rotating the stepping motor in the self-starting range. When operating the stepping motor in the self-starting range in this manner, however, the rotating power of the stepping motor increases. This causes vibrations and noises as well.

FIG. 2A is a diagram illustrating the vibrations caused when paper feeding is executed and then stopped after the actuation in the self-starting range described above. FIG. 2B is a diagram showing the vibrations caused when paper feeding is stopped after the actuation in a through-area. When the next operation command is inputted during the occurrence of vibrations after actuating the stepping motor, the next phase can not be surely magnetized because of an instability of a rotor state due to the vibrations. This results in the occurrence of an out-of-synchronism state. For preventing such an out-of-synchronism state, as disclosed in Japanese Patent Application Laid-Open No. 54-49026, the positioning phase continues to be magnetized by causing an electric current to flow thereto until the vibrations of the rotor are stopped. A positional relation between the rotor and a stator is thereby established, thus preventing the out-of-synchronism state. This method, however, presents the following problem. After operating the stepping motor, there is needed a waiting time until the vibrations of the rotor and the stator are stopped invariably for a period of several 10 ms through several 100 ms. Thus, the throughput is reduced, correspondingly.

SUMMARY OF THE INVENTION

It is a primary object of the present invention to obviate the above-described defects to make the rotation of a motor controllable by setting a magnetization maintaining time of the motor that is matched with the behavior characteristic of the motor.

Other objects of the present invention will become apparent from a concrete embodiment which will be discussed below.

BRIEF DESCRIPTION OF THE DRAWINGS

FIG. 3 is a flowchart showing processing procedures in the motor control system in the embodiment.

DESCRIPTION OF THE PREFERRED EMBODIMENT

A preferred embodiment of the present invention will hereinafter be described in detail with reference to the accompanying drawings.

Figure 1:
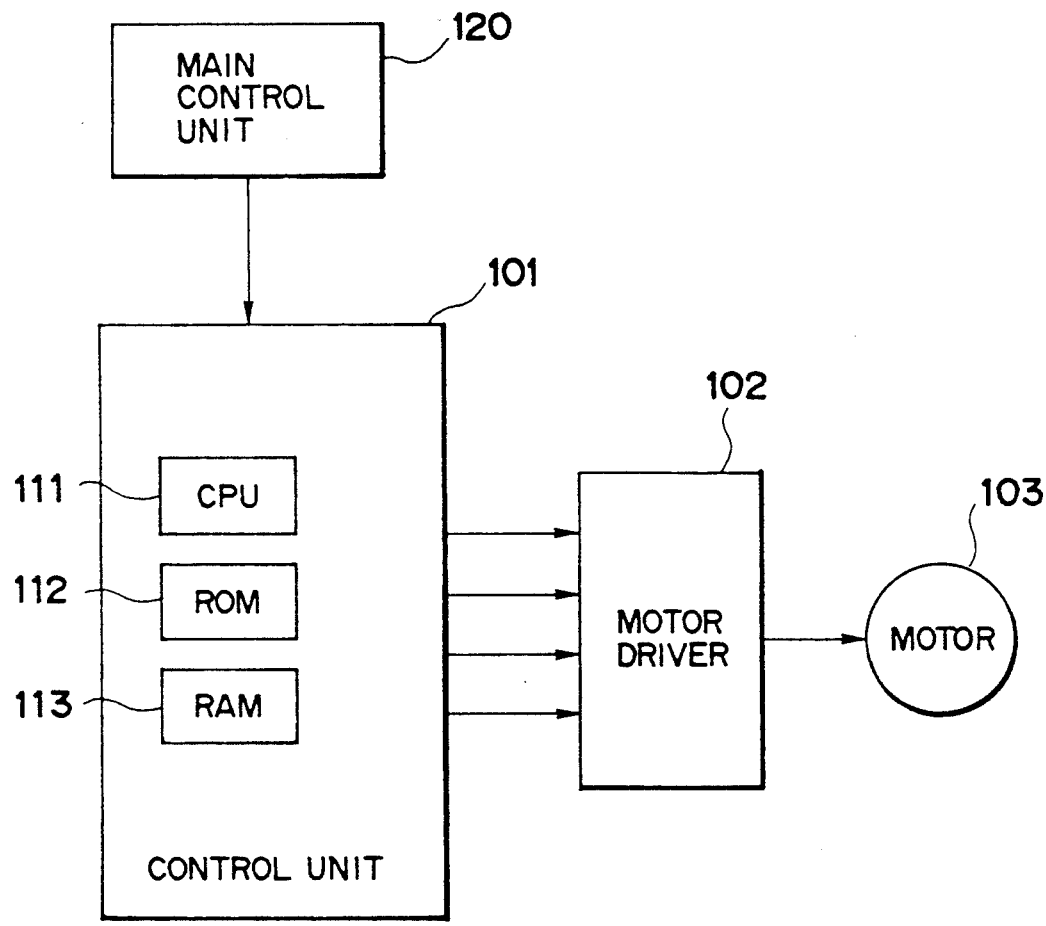
FIG. 1 is a block diagram schematically illustrating the construction of a motor control system according to the present invention.
Figure 2A:
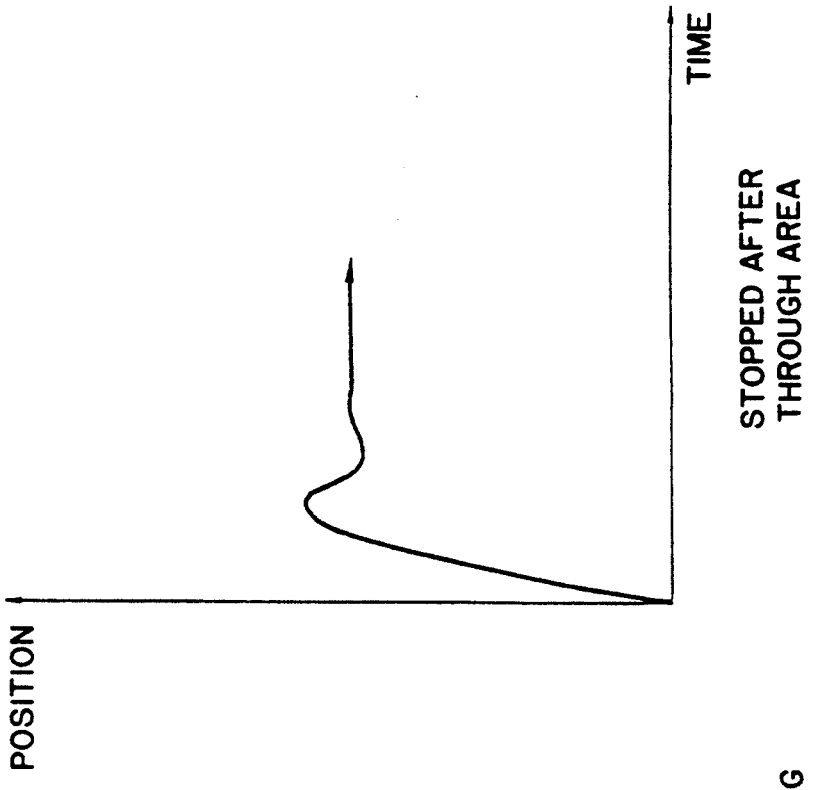
FIGS. 2A and 2B are diagrams showing states of vibrations when paper feeding is stopped after a self-starting range of a stepping motor and when paper feeding is stopped after a through-area.
Figure 2B:
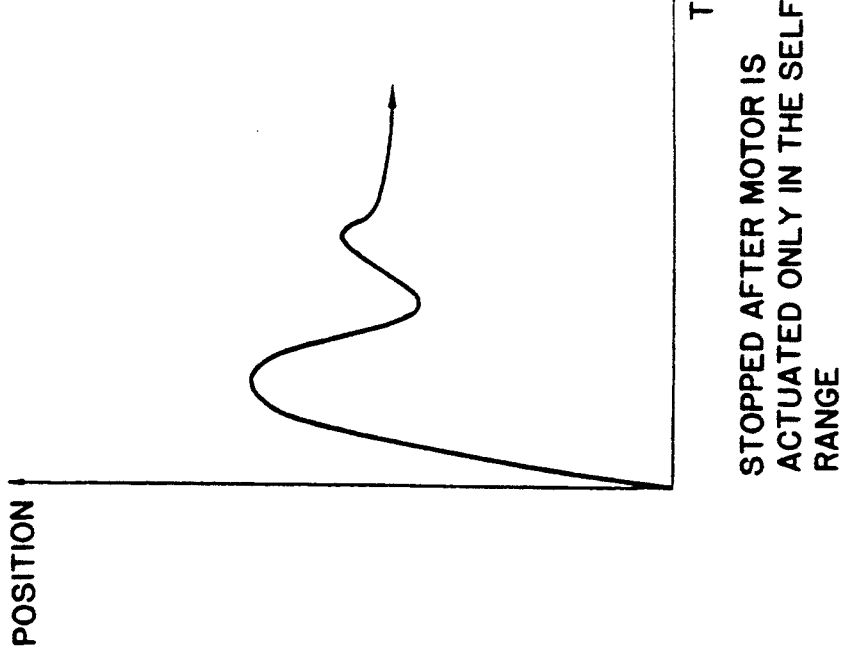

FIG. 1 is a block diagram schematically illustrating a construction of a motor control unit by way of one embodiment of the present invention. Referring to the same Figure, numeral 101 represents a control unit for controlling a rotation of a motor 103. The control unit 101 incorporates a CPU 111 such as, e.g., a microprocessor, etc., a ROM 112 for storing a control program of the CPU 111 and various items of data and a RAM 113, employed as a work area for the CPU 111, for temporarily storing the various items of data. Designated by 102 is a motor driver for inputting a phase magnetization signal outputted from the control unit 101 and rotationally driving the motor 103 such as, e.g., a stepping motor or the like. A main control unit generally indicated by 120 outputs a motor drive command or the like to the control unit 101.

FIG. 3 is a flowchart showing a paper feed process in the case where the motor control unit is adopted in a paper feed device. The ROM 112 stores the control program by which this process is executed.

At the first onset of the method, when a paper feed command is inputted from the main control unit 120 in step S1, the operation moves to step S2 where an indicated paper feed quantity is inputted. Checked in step S3 is whether or not this indicated paper feed quantity is less than a predetermined value, i.e. which is necessary for a line-up which occurs, for example, when a carrier length corresponds to several steps of the motor 103. If the paper feed quantity is less than the predetermined value, the operation moves to step S4 where the rotation of the motor 103 is actuated in a self-starting range. Then, the motor 103 is rotationally driven through only a step angle corresponding to the indicated paper feed quantity, thus carrying the recording paper. After the carrying of the recording paper has been thus finished, the operation moves to step S5. Electrification is effected therein for a relatively long time to stop with a phase (last phase) at a desired stop position, thereby maintaining a magnetization phase. Then, the operation moves to step S6. When the next paper feed command is inputted, the operation returns to step S1, and the processes described above are repeatedly executed.

On the other hand, if the indicated paper feed quantity exceeds the predetermined value in step S3, the operation moves to step S7, wherein ramp-up control (acceleration control) is performed to control the rotation of the stepping motor 103. Next, the operation moves to step S8 where the magnetization phase is maintained for a relatively short magnetizing time, and desired positioning is thus carried out. Thereafter, the operation moves to step S6 to wait for an input of the next command.

Incidentally, speaking of the ratio of the magnetization maintaining time of step S5 to that of step S8 in this flowchart, the maintaining time of step S5 should be 10 times at the maximum as large as the maintaining time of step S8.

As discussed above, in accordance with this embodiment, it is possible to prevent an out-of-synchronism state due to the self-starting range and also to increase the paper-feed velocity in a through-area.

An improvement in the throughput can be thereby attained, and the rotation of the motor can be also controlled by use of the small-sized motor at a high efficiency.

Where the paper is continuously fed in infinitesimal steps, the positioning accuracy thereof is remarkable.

Note that the present invention may be applied a system constructed of a plurality of appliances or to an apparatus constructed of a single appliance. Further, the present invention is, as a matter of course, applicable to such a case as to be accomplished by supplying the system or the apparatus with a program for embodying the present invention.

Moreover, this embodiment has dealt with the case of the paper feed motor of the printer but is not limited to this. For instance, the present invention is, as a matter of cource, applicable to the control of a carriage carrier motor of the printer or other typical motors.

As discussed above, the present invention exhibits such an effect that the rotations of the motor can be controlled at the high efficiency by setting the magnetization maintaining time of the motor which matches with a behavior characteristic of the motor.

Although the illustrative embodiment of the present invention has been described in detail with reference to the accompanying drawings, it is to be understood that the present invention is not limited to this embodiment. Various changes or modifications may be effected by one skilled in the art without departing from the scope or spirit of the invention.

What is claimed is:

1. A method of controlling a stepping motor, comprising the steps of:

determining an amount of rotation of the stepping motor in conformity with a rotation indicating command;

determining whether or not rotation actuating control of the stepping motor is to be performed by a ramp-up operation in accordance with the amount of rotation of the motor;

said determining step determining whether rotation actuating control of the stepping motor is executed by a ramp-up operation or in a self-starting range;

controlling the rotation of the stepping motor by providing driving pulses sequentially to respective phases of the stepping motor to produce magnetization of the respective phases in accordance with the amount of rotation of the motor to stop a phase of the motor at a desired stop position at a stopping time;

maintaining the magnetization to hold a rotor of the stepping motor in a stable position with respect to the phase which has been magnetized last at the stopping time in said controlling step; and changing a magnetization maintaining time in said maintaining step in accordance with the determination in said determining step, said changing step comprising the step of maintaining the magnetization maintaining time of the stepping motor for a short time when said determining step determines that the rotation actuating control is executed by the ramp-up operation and maintaining the magnetization maintaining time of the stepping motor for a long time, longer than the short time, when said determining step determines that the rotation actuating control is executed in the self-starting range.

2. The method of controlling the stepping motor as defined in claim 1, further comprising the step of controlling the rotation of the stepping motor by providing the driving pulses sequentially to the respective phases of the stepping motor in accordance with the amount of rotation of the motor in conformity with a subsequent rotation indicating command after said magnetization maintaining step.

3. A method of controlling a paper feed stepping motor, comprising the steps of:

determining a paper feed quantity of paper fed by the paper feed stepping motor in conformity with a paper feed command;

determining whether or not rotation actuating control of the paper feed stepping motor is executed by a ramp-up operation in accordance with the paper feed quantity, said determining step determining whether rotation actuating control of the paper feed stepping motor is executed by a ramp-up operation or in a self-starting range;

controlling a rotation of the paper feed stepping motor by providing driving pulses sequentially to respective phases of the paper feed stepping motor to produce magnetization in the respective phases in accordance with the paper feed quantity to stop a phase of the paper feed stepping motor at a desired stop position at a stopping time; and maintaining the magnetization to hold a rotor of the paper feed stepping motor in a stable position with respect to the phase which has been magnetized last at the stopping time in said controlling step and changing a magnetization maintaining time in accordance with the determination in said determining step, said magnetization maintaining step comprising the step of maintaining the magnetization maintaining time of the stepping motor for a short time when said determining step determines that the rotation actuating control is executed by the ramp-up operation and maintaining the magnetization maintaining time of the stepping motor for a long time, longer than the short time, when said determining step determines that the rotation actuating control is executed in the self-starting range.

* * * * *

UNITED STATES PATENT AND TRADEMARK OFFICE
CERTIFICATE OF CORRECTION

PATENT NO. : 5,327,063
DATED : July 5, 1994
INVENTOR(S) : AKIRA MIYAKAWA

It is certified that error appears in the above-indentified patent and that said Letters Patent is hereby corrected as shown below:

COVER PAGE item [56] REFERENCES CITED

Insert --FOREIGN PATENT DOCUMENTS 0257473 3/1988 Europe
0200959 12/1986 Europe
54-49026 4/1979 Japan--.

U.S. PATENT DOCUMENTS

"4,924,185 5/1990 Kohno" should read
--4,924,165 5/1990 Kohno--.

COLUMN 1

Line 28, "and consumed" should read --and the consumed--.
Line 29, "the" should be deleted.

UNITED STATES PATENT AND TRADEMARK OFFICE
CERTIFICATE OF CORRECTION

PATENT NO. : 5,327,063

DATED : July 5, 1994

INVENTOR(S) : Akira Miyakawa

It is certified that error appears in the above-indentified patent and that said Letters Patent is hereby corrected as shown below:

COLUMN 3

Line 41, "applied" should read --applied to--.
Line 51, "cource," should read --course,--.

Signed and Sealed this

Twenty-ninth Day of November, 1994

Attest:

BRUCE LEHMAN

Attesting Officer     Commissioner of Patents and Trademarks